(12) United States Patent
Chu et al.

(10) Patent No.: US 8,129,053 B2
(45) Date of Patent: Mar. 6, 2012

(54) SECONDARY BATTERY OF IMPROVED HIGH-RATE DISCHARGING PROPERTIES

(75) Inventors: Seung W. Chu, Daejeon (KR); Dongmyung Kim, Daejeon (KR); Kwonyoung Choi, Daejeon (KR); Yong Jeong Kim, Daejeon (KR); Jong Hee Kim, Daejeon (KR); Dong Myung Oh, Seoul (KR); Bora Shin, Seoul (KR)

(73) Assignee: LG Chem, Ltd. (KR)

( * ) Notice: Subject to any disclaimer, the term of this patent is extended or adjusted under 35 U.S.C. 154(b) by 282 days.

(21) Appl. No.: 12/440,780

(22) PCT Filed: Aug. 4, 2007

(86) PCT No.: PCT/KR2007/003759
§ 371 (c)(1),
(2), (4) Date: Aug. 24, 2009

(87) PCT Pub. No.: WO2008/035854
PCT Pub. Date: Mar. 27, 2008

(65) Prior Publication Data
US 2010/0047694 A1    Feb. 25, 2010

(30) Foreign Application Priority Data
Sep. 18, 2006 (KR) .................. 10-2006-0089896

(51) Int. Cl.
*H01M 4/62* (2006.01)
(52) U.S. Cl. ....................... 429/232; 429/307
(58) Field of Classification Search ............ 429/232
See application file for complete search history.

(56) References Cited

U.S. PATENT DOCUMENTS

| | | | |
|---|---|---|---|
| 6,245,465 B1 | 6/2001 | Angell et al. | |
| 6,475,678 B1 | 11/2002 | Suzuki | |
| 6,541,140 B1 | 4/2003 | Spillman et al. | |
| 2001/0038949 A1* | 11/2001 | Hatazaki et al. | 429/324 |
| 2002/0039677 A1* | 4/2002 | Iwamoto et al. | 429/122 |
| 2004/0009396 A1* | 1/2004 | Kim et al. | 429/212 |
| 2005/0220700 A1* | 10/2005 | Suhara et al. | 423/594.4 |

FOREIGN PATENT DOCUMENTS

| | | |
|---|---|---|
| JP | 9213308 | 8/1997 |
| JP | 9306501 | 11/1997 |
| JP | 11214016 | 8/1999 |
| JP | 2000082471 | 3/2000 |
| JP | 2002305023 | 10/2002 |
| JP | 2003096232 | 4/2003 |
| KR | 1996-0027036 | 12/1997 |
| KR | 20010066272 | 7/2001 |

OTHER PUBLICATIONS

International Search Report, PCT/KR2007/003759.

* cited by examiner

*Primary Examiner* — Patrick Ryan
*Assistant Examiner* — Brent Thomas
(74) *Attorney, Agent, or Firm* — Lerner, David, Littenberg, Krumholz & Mentlik, LLP

(57) ABSTRACT

Provided is a secondary battery comprising a cathode active material having low-electrolyte wettability as a main ingredient, which is capable of improving high-rate discharge properties by an addition of a perfluorinated sulfonamide substituent-containing polymer ("additive") to a cathode mix and/or an electrolyte.

8 Claims, 1 Drawing Sheet

[Fig. 1]
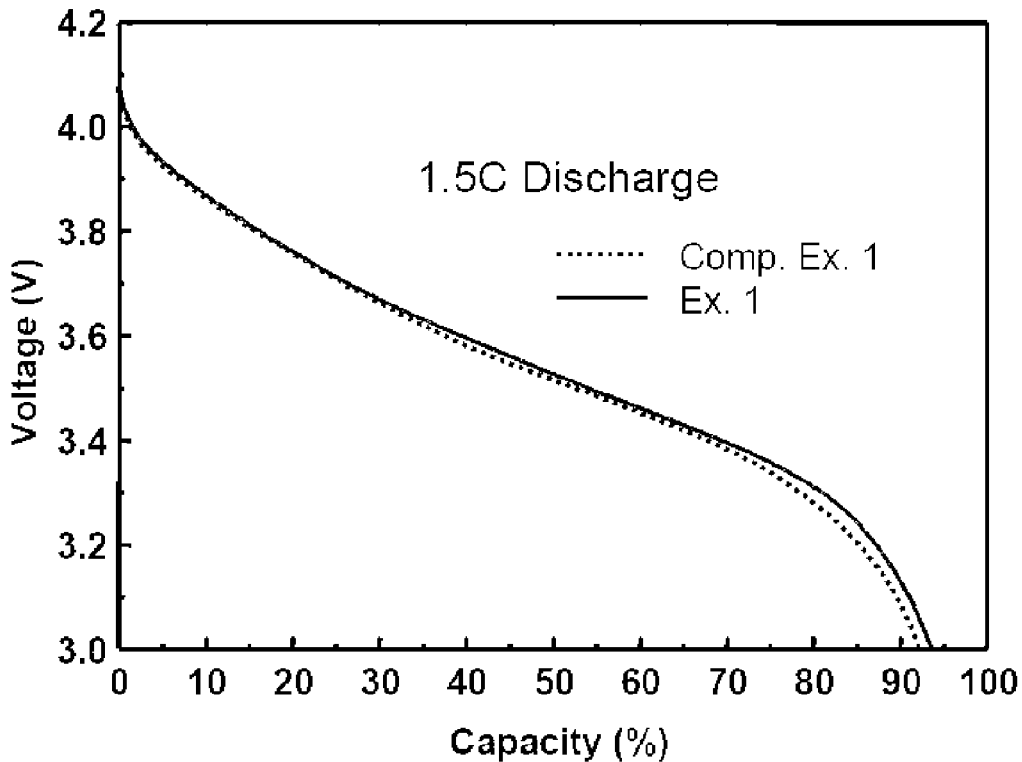
[Fig. 2]
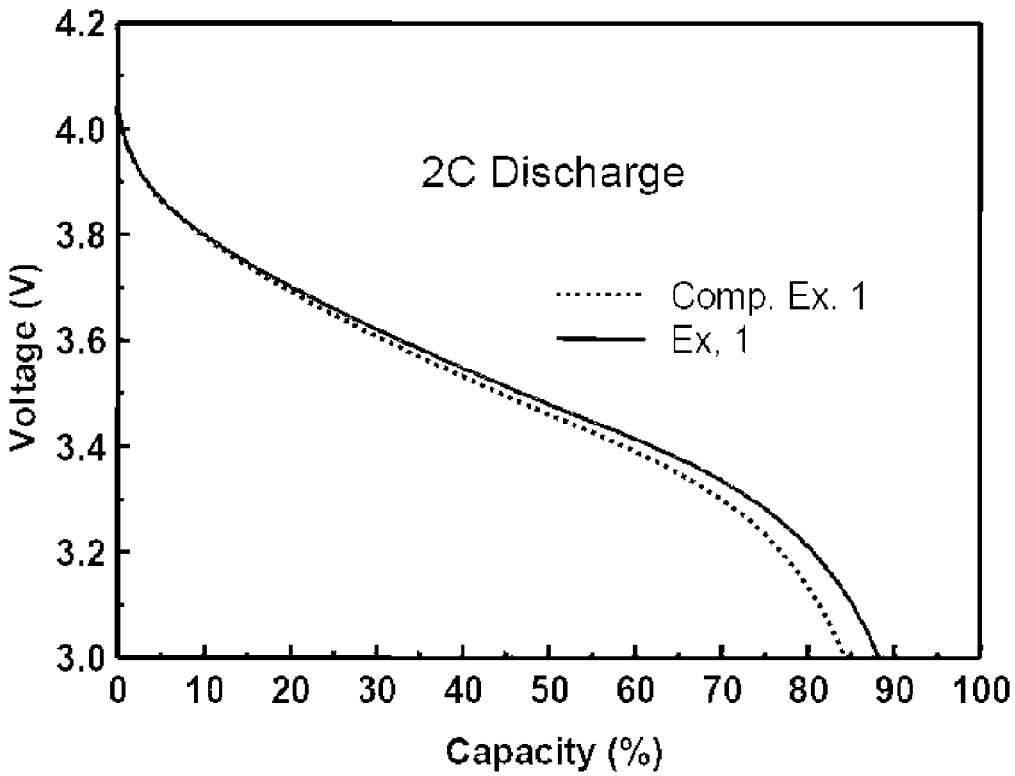

SECONDARY BATTERY OF IMPROVED HIGH-RATE DISCHARGING PROPERTIES

CROSS REFERENCE TO RELATED APPLICATIONS

The present application is a national phase entry under 35 U.S.C. §371 of International Application No. PCT/KR2007/003759, filed Aug. 4, 2007, published in English, which claims priority from Korean Patent Application No. 10-2006-0089896, filed Sep. 18, 2006. The disclosures of said applications are incorporated by reference herein.

TECHNICAL FIELD

The present invention relates to a secondary battery with improved high-rate discharge properties. More specifically, the present invention relates to a secondary battery comprising a cathode active material having low-electrolyte wettability as a main ingredient, which is capable of improving high-rate discharge properties by an addition of a perfluorinated sulfonamide substituent-containing polymer ("additive") to a cathode mix and/or an electrolyte.

BACKGROUND ART

Technological development and increased demand for mobile equipment have led to a rapid increase in the demand for secondary batteries as an energy source. In the light of such trends, a great deal of research and study has been focused on secondary batteries which are capable of meeting various demands of consumers, and have high energy density and voltage.

The lithium secondary battery uses a metal oxide such as $LiCoO_2$ as a cathode active material and a carbon material as an anode active material, and is fabricated by disposition of a porous polyolefin separator between the anode and the cathode and addition of a non-aqueous electrolyte containing a lithium salt such as $LiPF_6$. Upon charging, lithium ions deintercalate from the cathode active material and intercalate into a carbon layer of the anode. In contrast, upon discharging, lithium ions deintercalate from the carbon layer of the anode and intercalate into the cathode active material. Here, the non-aqueous electrolyte serves as a medium through which lithium ions migrate between the anode and the cathode. Such a lithium secondary battery must be basically stable in an operating voltage range of the battery and must have an ability to transfer ions at a sufficiently rapid rate.

The non-aqueous electrolyte is incorporated into the battery at the final step of fabrication of the lithium secondary battery. Here, in order to reduce a period of time taken to fabricate the battery and optimize the battery performance, it is necessary to ensure rapid and complete wetting of the electrodes by the electrolyte.

As the non-aqueous electrolyte for the lithium secondary battery, aprotic organic solvents, such as ethylene carbonate (EC), diethyl carbonate (DEC) and 2-methyl tetrahydrofuran, are largely used. Such an electrolyte is a polar solvent having a polarity to an extent that can effectively dissolve and dissociate electrolyte salts and at the same time, is an aprotic solvent having no active hydrogen species. In addition, such an electrolyte often exhibits high viscosity and surface tension, due to extensive interactions occurring within the electrolyte. Therefore, the non-aqueous electrolyte for the lithium secondary battery exhibits a low affinity for electrode materials containing a binder such as polytetrafluoroethylene, polyvinylidene fluoride and the like, and therefore brings about a failure to achieve easy wetting of the electrode materials. Such a failure of easy wetting due to the low affinity, as will be illustrated hereinafter, is one of the primary causes which are responsible for deterioration of rate properties of the battery.

Further, with an increased cost of cobalt (Co) contained in lithium cobalt oxide ($LiCoO_2$) that has been conventionally and largely used as a cathode active material for a secondary battery, many attempts have been made to lower costs of the cathode active materials by a use of various transition metal mixed oxides instead of $LiCoO_2$ or by a combined use of them. However, such methods suffer from deterioration of high-rate discharge properties. Since the high-rate discharge properties significantly depend on the mobility of lithium ions (rate properties), it is possible to improve high-rate discharge properties and cling properties by enhancing the wettability of an electrolyte on the cathode active material to thereby improve rate properties.

In this connection, there are known a variety of techniques for improving the wettability of the electrolyte on electrodes. For example, Japanese Unexamined Patent Publication N). 2002-305023 and U.S. Pat. No. 6,245,465 disclose a method of improving the wettability of the electrolyte on the electrodes, by introducing into an electrolyte solvent, a fluoride (such as perfluorinated polyether) and sulfone substituted with various functional groups such as fluorinated alkyl.

Further, Japanese Unexamined Patent Publication Nos. 2000-082471 and 2003-096232 disclose an electrolyte with improved wettability by using an amphoteric surfactant (such as carboxylic acid salt type surfactant), or by using a copolymer of polyethylene oxide (PEO) and polypropylene oxide (PPO), which is substituted with a cross-linking agent having an oligoalkylene oxide structure.

Meanwhile, Korean Patent Application Publication Nos. 2001-066272 A1 and 1996-027036 A1 disclose polymer electrolytes which are prepared by mixing polyethylene oxide (PEO)- or polypropylene oxide (PPO)-based polymers with various lithium salts and metallocene, whereas Japanese Unexamined Patent Publication No. 1997-306501 discloses an organic electrolyte with an addition of an oleic amide surfactant which has an affinity for the organic electrolyte.

However, the secondary batteries of the aforesaid conventional prior arts were confirmed to suffer from the problems and disadvantages in that the overall operation properties of the fabricated battery are poor or at least a desired level of high-rate discharge properties is not exerted, due to high internal resistance.

DISCLOSURE OF INVENTION

Technical Problem

Therefore, it is an object of the present invention to solve the above problems, and other technical problems that have yet to be resolved.

As a result of a variety of extensive and intensive studies and experiments to solve the problems and disadvantages as described above, the inventors of the present invention have discovered that, upon addition of a certain material capable of improving the wettability of an electrolyte to a cathode mix or an electrolyte, relative to a cathode active material having low wettability on the electrolyte, it is possible to significantly improve high-rate discharge properties of the battery without causing deterioration of general operation properties and performance of the battery. The present invention has been completed based on these findings.

Technical Solution

In accordance with an aspect of the present invention, the above and other objects can be accomplished by the provision of a secondary battery comprising a cathode active material having low-electrolyte wettability as a main ingredient, wherein a perfluorinated sulfonamide substituent-containing polymer ("additive") is added to a cathode mix and/or an electrolyte to thereby improve high-rate discharge properties.

The secondary battery in accordance with the present invention significantly improves the wettability of the cathode active material on the electrolyte via the incorporation of the above-mentioned additive into the cathode mix and/or the electrolyte, and consequently increases the mobility of lithium ions due to the lowered charge transfer resistance, thereby resulting in significant improvements in the high-rate discharge properties.

The cathode active material in accordance with the present invention is a cathode active material having the low wettability on the electrolyte, and may preferably include multi-component cathode active materials containing at least two transition metal elements.

Generally, mono-transition metal oxides, such as lithium cobalt oxide ($LiCoO_2$) and the like, consist of independent phases of small particles (primary particles). On the other hand, binary transition metal oxides (such as lithium nickel-cobalt oxides, lithium nickel-manganese oxides, lithium manganese-cobalt oxides, and the like) and ternary transition metal oxides (such as lithium nickel-manganese-cobalt oxides) usually have an agglomerate secondary particle structure in which primary particles are agglomerated to form secondary particles.

These multi-component transition metal oxides exhibit a significantly low diffusion rate of lithium ions in crystals, as compared to mono-transition metal oxides, and it is thus preferred to prepare the oxide in the form of a small particle so as to compensate for such a slow diffusion rate of lithium ions. Further, in order to prepare the multi-component transition metal oxides in the form of independent-phase primary particles, it is necessary to elevate the sintering temperature during the preparation process. However, the elevation of the sintering temperature leads to non-uniformity in the crystal structure. Therefore, the sintering temperature should be lowered to achieve formation of the uniform crystal structure, but such a low sintering temperature suffers from limitations in growth of the particle size.

For these reasons, multi-component transition metal oxides, such as binary transition metal oxides and ternary transition metal oxides, are prepared in the form of agglomerate secondary particles of primary particles and such an agglomerated structure limits the access of the electrolyte to the surface of the particles. Consequently, rate properties of the multi-component transition metal oxides are typically inferior to those of the mono-transition metal oxides.

Therefore, the cathode active material in the secondary battery according to the present invention preferably contains the multi-component transition metal oxide of the agglomerate secondary particle structure having a low-electrolyte wettability as a main ingredient. More specifically, the content of the multi-component transition metal oxide is in a range of more than 5% by weight, preferably more than 20% by weight, based on the total weight of the cathode active material. Therefore, the aforesaid additive can improve the wettability of the electrolyte on the multi-component transition metal oxide having the agglomerate secondary particle structure, thereby increasing a diffusion rate of lithium ions to a level corresponding to that of the primary particles.

There is no particular limit to the multi-component transition metal oxides, as long as they are materials having an agglomerate structure with the low-electrolyte wettability. Preferably, lithium nickel-manganese-cobalt oxides may be used as the multi-component transition metal oxide. A typical example of the lithium nickel-manganese-cobalt oxide may be $LiNi_{1/3}Mn_{1/3}Co_{1/3}O_2$.

When it is added to the electrolyte, the additive is preferably contained in an amount of 0.01 to 10% by weight, based on the total weight of the electrolyte. If a content of the additive is excessively low, it is difficult to achieve desired effects of additive addition. On the other hand, if a content of the additive is excessively high, this may undesirably lead to problems associated with a solution injection process due to an increased viscosity of the electrolyte.

Further, when the additive is directly contained in the cathode active material, 0.05 to 5% by weight of the additive is preferably added, based on the total weight of a cathode mix. If a content of the additive is excessively low, it is difficult to achieve desired addition effects. On the other hand, if a content of the additive is excessively high, this may undesirably lead to deterioration of battery operation properties due to increased internal resistance.

Examples of the perfluorinated sulfonamide substituent-containing polymers, which are additives capable of improving the wettability of the electrolyte on the cathode active material, may include modified copolymers in which either or both ends of a block copolymerization structure of polyethylene oxide (PEO) and polypropylene oxide (PPO) have perfluorinated sulfonamide substituent(s).

The PEO-PPO block copolymer has a structure consisting of a hydrophilic polyethylene oxide (PEO) chain and a hydrophobic polypropylene oxide (PPO) chain as a repeating unit. The PEO-PPO block copolymer has very little adverse effects on the operation mechanism of the battery. The PEO-PPO block copolymer can improve the wettability of the electrolyte on the electrodes, due to the presence of both hydrophilic and hydrophobic portions in the molecular structure. Further, the aforementioned material, via binding of perfluorinated sulfonamide substituents having large numbers of very low-surface energy fluorine on ends of the block copolymerization structure, has a further lower surface energy, as compared to a single use of the PEO-PPO block copolymer. Such a type of binding brings about changes in a surface energy gradient of the material concerned, which then maximizes the wettability of the electrolyte on the cathode and consequently makes a contribution to improvements of high-rate discharge properties.

The number of the PEO block and the PPO block in the PEO-PPO block copolymer is not particularly limited. Further, irrespective of kinds of blocks Constituting ends of the copolymer, the perfluorinated sulfonamide substituent(s) is (are) bound to either or both ends of the copolymer.

In addition, since the PEO-PPO block copolymer is composed of the PEO block and the PPO block, more preferred is a structure in which the perfluorinated sulfonamide substituent is bound to the end of the PEO block, upon construction of both ends thereof. This is because binding of the perfluorinated sulfonamide substituent to the end of the PPO block leads to an inclination of the energy gradient toward one side, thereby lessening the desired effects. That is, upon the presence of hydrophobic functional groups on both ends of the material concerned, the surfactant acts in a V-shape on the material thereby providing two anchors that connect between the hydrophilic group and the hydrophobic group. Whereas, binding of the perfluorinated sulfonamide substituent to the end of the PPO block leads to the action of the surfactant in an I-shape on the material thereby providing only one anchor, consequently decreasing the efficiency of substituent addition.

In one preferred embodiment, the additive is a copolymer represented by Formula I below:

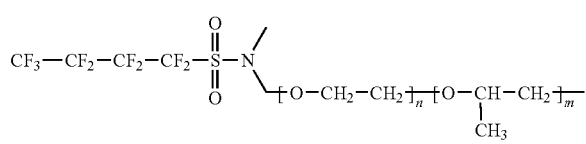

(I)

wherein n is in a range of 40 to 1000, m is in a range of 40 to 200, and n=Am wherein A has a value of 1 to 5.

As a representative example of the material of Formula I, FC4430 (manufactured by 3M) is commercially available.

The additive may be directly added to the cathode active material or electrolyte, or otherwise may be added after dissolution or dispersion thereof in a suitable solvent, if necessary.

The content of PEO in the PEO-PPO block copolymer is at least higher than that of PPO and is preferably in a range of 30 to 80% by weight, based on the total weight of the copolymer. Therefore, since there is a sufficient length of the PEO block, the distance between the perfluorinated sulfonamide substituent and the PPO block increases to weaken the repulsive force therebetween, thereby making it relatively easier to achieve V-shape bending of the copolymer.

On the other hand, if the content of PEO in the block copolymer is lower than that of PPO, the PEO block is shorter than the PPO block. As a result, the presence of the copolymer in a V-shape becomes unstable due to the repulsive force resulting from a difference in the surface energy between the perfluorinated sulfonamide substituent and the PPO block and therefore it is impossible to sufficiently exert anchor effects.

Hereinafter, other components necessary for fabrication of the lithium secondary battery awarding to the present invention will be described.

The cathode for the lithium secondary battery is fabricated by applying a mixture of the aforesaid cathode active material, a conductive material and a binder in the form of slurry to a cathode current collector, followed by drying and pressing. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. As examples of the materials for the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and the conductive material, and in binding of the active material with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient added to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fibers and carbon fibers.

The anode for the lithium secondary battery is fabricated by applying an anode material to an anode current collector, followed by drying and pressing. If necessary, the other components (such as binder, conductive material, filler, and the like) as described above for the cathode may be further included.

The anode current collector is generally fabricated to have a thickness of 3 to 500 μm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesion to the anode active material. In addition, the anode current collector may be used in various forms including films, sheets, foils, nets, porous structures, foams and non-woven fabrics.

As examples of the anode materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 \leq x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator for the lithium secondary battery is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of olefin polymers such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The non-aqueous electrolyte for the lithium secondary battery is composed of a non-aqueous electrolyte and lithium. As the non-aqueous electrolyte, a non-aqueous electrolytic solution, an organic solid electrolyte or an inorganic solid electrolyte may be employed.

As the non-aqueous electrolytic solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4LiI$—$LiOH$, $Li_2SiS_3$, $Li_4SiO_4$, $Li_4SiO_4LiI$—$LiOH$ and $Li_3PO_4Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing changes in a discharge capacity of batteries of Example 1 and Comparative Example 1 under a discharge condition of 1.5 C; and FIG. 2 is a graph showing changes in a discharge capacity of batteries of Example 1 and Comparative Example 1 under a discharge condition of 2 C.

MODE FOR THE INVENTION

Now, the present invention will be described in more detail with reference to the following Examples. These examples are provided only for illustrating the present invention and should not be construed as limiting the scope and spirit of the present invention.

Example 1

A lithium secondary battery was fabricated according to the following procedure.

1-1. Fabrication of Cathode

A mixture of $LiCoO_2$ and $LiNi_{1/3}Mn_{1/3}Co_{1/3}O_2$ ("NMC") having an average particle diameter of about 10 μm was used as a cathode active material. Specifically, 47.5% by weight of $LiCoO_2$, 47.5% by weight of NMC, 2.5% by weight of Super-P (conductive material) and 2.5% by weight of PVdF (binder) were added to N-methyl-2-pyrrolidone (NMP) as a solvent to thereby prepare a cathode slurry. Thereafter, the resulting cathode slurry was coated at 3 mAh/cm$^2$ on an aluminum current collector, dried and pressed to a thickness of 131 μm to thereby fabricate a cathode.

1-2. Fabrication of Anode 95.3% by weight of artificial graphite having an average particle diameter of about 10 μm as an anode active material, 0.7% by weight of Super-P (conductive material) and 4% by weight of PVdF (binder) were added to NAP as a solvent to thereby prepare an anode slurry. Thereafter, the resulting anode slurry was coated at 3 mAh/cm$^2$ on a copper current collector, dried and pressed to a thickness of 125 μm to thereby fabricate an anode.

1-3. Preparation of Electrolyte

An ethylene carbonate (EC)/ethylmethyl carbonate (EMC)-based organic solution of EC/EMC (1:2) containing a 1M $LiPF_6$ was used as an electrolyte. As a PEO-PPO block copolymer substituted with perfluorinated sulfonamide, 0.5% by weight of FC4430 (manufactured by 3M) was added to the electrolyte solution, thereby preparing an electrolyte for a lithium secondary battery.

1-4. Fabrication of Battery

A porous separator (trade name: Celgard™) having a thickness of 20 μm was disposed between the cathode and the anode fabricated in Sections 1-1 and 1-2, respectively, and the non-aqueous electrolyte prepared in Section 1-3 was injected into the resulting electrode assembly to thereby fabricate a lithium secondary battery. Herein, after injection of the electrolyte, battery assembling was carried out without a separate aging process.

Comparative Example 1

A lithium secondary battery was fabricated in the same manner as in Example 1, except that FC4430 was not added to an electrolyte.

Comparative Example 2

A lithium secondary battery was fabricated in the same manner as in Example 1, except that only $LiCoO_2$ was used as a cathode active material.

Comparative Example 3

A lithium secondary battery was fabricated in the same manner as in Comparative Example 2, except that FC4430 was not added to an electrolyte.

Example 2

A lithium secondary battery was fabricated in the same manner as in Example 1, except that 20% by weight of NMC was added to a cathode active material.

Comparative Example 4

A lithium secondary battery was fabricated in the same manner as in Example 2, except that FC4430 was not added to an electrolyte.

Experimental Example 1

Lithium secondary batteries fabricated in Examples 1 and 2 and Comparative Examples 1 to 4 were discharged at a rate of 0.2 C, 0.5 C, 1 C, 1.5 C and 2 C, and a discharge capacity was compared therebetween. The results thus obtained are given in Table 1 below. Table 1 shows relative values of the capacity under various discharge conditions, by taking a discharge condition of 0.2 C to be a reference (100). In addition, 1.5 C and 2 C discharge graphs for secondary batteries of Example 1 and Comparative Example 1 are shown in FIGS. 1 and 2.

TABLE 1

|  | Ex. 1 | Comp. Ex. 1 | Comp. Ex. 2 | Comp. Ex. 3 | Ex. 2 | Comp. Ex. 4 |
|---|---|---|---|---|---|---|
| 0.2 C | 100 | 100 | 100 | 100 | 100 | 100 |
| 0.5 C | 97.934 | 97.414 | 98.390 | 98.321 | 98.290 | 98.291 |
| 1 C | 95.592 | 94.612 | 96.721 | 96.724 | 96.72 | 96.55 |
| 1.5 C | 93.611 | 92.211 | 95.949 | 96.006 | 95.821 | 94.352 |
| 2 C | 88.337 | 84.281 | 92.709 | 92.832 | 91.018 | 89.201 |

As can be seen from Table 1, an increase in the discharge rate generally leads to a decrease in the discharge capacity. However, upon high-rate discharging at a rate of more than 1 C, the battery of Example 1 in accordance with the present invention exhibited a superior discharge capacity, as compared to the battery of Comparative Example 1. Particularly, it can be seen that an increasing discharge rate leads to a significant difference in the discharge capacity. Such an event can be similarly found in the battery of Example 2 and the battery of Comparative Example 4.

On the other hand, it can be seen that batteries (Comparative Examples 2 and 3) using only a mono-transition metal oxide $LiCoO_2$ as a cathode active material generally exhibit superior high-rate discharge capacity retention (%), as compared to the battery (Comparative Example 1) containing a multi-component transition metal oxide as a main ingredient, but they are not substantially affected by the addition of FC4430.

As a result, it can be seen that the battery, in which at least a portion of the multi-component transition metal oxide, e.g. NMC, is contained as an electrode active material, exhibits an increased high-rate discharge capacity due to an improvement of cathode wettability by an addition of an additive awarding to the present invention.

INDUSTRIAL APPLICABILITY

As apparent from the above description, a secondary battery awarding to the present invention exhibits an increased high-rate discharge capacity due to an increased electrolyte-cathode reaction area by an addition of a certain additive to a cathode mix and/or an electrolyte to improve wettability of the cathode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery comprising a cathode active material having low-electrolyte wettability as a main ingredient, wherein a perfluorinated sulfonamide substituent-containing polymer ("additive") is added to (i) a cathode mix, or (ii) an electrolyte, or (iii) a cathode mix and an electrolyte to thereby improve high-rate discharge properties, and
    wherein the cathode active material having the low wettability on the electrolyte is a multi-component cathode active material containing at least two transition metal elements, and
    wherein the additive is a modified copolymer having perfluorinated sulfonamide substituent(s) bound to either or both ends of a block copolymerization structure of polyethylene oxide (PEO) and polypropylene oxide (PPO), and
    wherein the PEO-PPO block copolymer comprises a PEO block and PPO block, and upon construction of both ends of the block copolymer, a perfluorinated sulfonamide substituent is bound to the end of the PEO block.

2. The battery according to claim 1, wherein the multi-component cathode active material has an agglomerate secondary particle structure in which primary particles are agglomerated to form secondary particles.

3. The battery according to claim 1, wherein the content of the multi-component transition metal oxide is in the range of more than 20% by weight, based on the total weight of the cathode active material.

4. The battery according to claim 1, wherein the multi-component transition metal oxide is a lithium nickel-manganese-cobalt oxide.

5. The battery according to claim 1, wherein the additive is added in an amount of 0.01 to 10% by weight, based on the total weight of the electrolyte.

6. The battery according to claim 1, wherein the additive is added in an amount of 0.05 to 5% by weight, based on the total weight of the cathode mix.

7. The battery according to claim 1, wherein the copolymer is represented by
Formula I below:
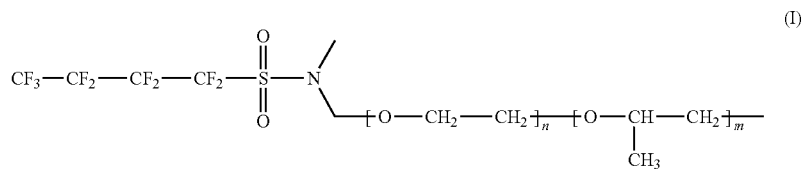
wherein n is in the range of 40 to 1000, m is in the range of 40 to 200, and n=Am wherein A has a value of 1 to 5.
8. The battery according to claim 1, wherein the content of PEO in the PEO-PPO block copolymer is in the range of 30 to 80% by weight, based on the total weight of the copolymer.
* * * * *

UNITED STATES PATENT AND TRADEMARK OFFICE
CERTIFICATE OF CORRECTION

PATENT NO. : 8,129,053 B2
APPLICATION NO. : 12/440780
DATED : March 6, 2012
INVENTOR(S) : Seung W. Chu et al.

It is certified that error appears in the above-identified patent and that said Letters Patent is hereby corrected as shown below:

In the Specification

Column 2, line 22, "Publication N)." should read -- Publication No. --.
Column 4, line 54, "Constituting" should read -- constituting --.
Column 8, line 38, "NAP" should read -- NMP --.

Signed and Sealed this
Twenty-seventh Day of August, 2013

Teresa Stanek Rea
*Acting Director of the United States Patent and Trademark Office*